2,695,258
PEST CONTROL SMOKE GENERATORS

Cecil Johnstone, Ardrossan, and Douglas J. B. Marke, West Kilbride, Scotland, assignors to Imperial Chemical Industries Limited, a corporation of Great Britain No Drawing. Application June 27, 1952,
Serial No. 296,068

Claims priority, application Great Britain
September 14, 1951

9 Claims. (Cl. 167—40)

The present invention relates to the art of fumigating with pesticidal compounds, and more particularly to the provision of an improved composition for the thermal production of fumes of pesticidal compounds that are capable of vaporization when suitably heated. The invention is especially valuable for the purpose of fumigating with combustible pesticidal compounds or pesticidal compounds easily decomposed when overheated.

In the majority of pest control smoke generators of the kind wherein a vaporizable pest control compound is associated with a mixture of solid ingredients capable when locally sufficiently heated of undergoing self-sustained gas-producing exothermic reaction the said mixture has comprised an organic combustible material and an inorganic oxidizing agent, the pest control compound being either mixed with these ingredients or so separated from them in the generator as to be swept by the hot gases they produce. It is essential that the production of the stream of gases laden with the pest control compound produced by the generator should not be accompanied by flame as this would have the effect of destroying the pest control compound. As the majority of pest control smoke generators depending for their action on the use of organic combustible material and inorganic oxidizing agents are of low biological efficiency this can be attributed to the excessively high temperature at which these ingredients react. These ingredients are also unable to react in the self-sustained manner if they are loaded with sufficient pest control compound to bring down the temperature of a reaction zone in the pesticidal mixture to below the decomposition temperature of the pest control compound.

Very much better results have been obtained by employing ammonium nitrate or guanidine nitrate in association with one or more sensitizers for self-sustained flameless exothermic gas-producing decomposition, for which purpose certain chromates or dichromates have been successfully employed. Although the biological efficiency of pest control smoke generating compositions based on ammonium nitrate and salts of chromic acid is high these compositions are hygroscopic and must therefore in practice be packaged in sealed containers. The gases they produce are also acidic, so it is on the whole often undesirable to expose for example dyed silk or rayon articles to such smokes. They are, however, successfully employed both for disinfestation of plants in greenhouses and for the control of insects in other types of buildings, but some skill and care may be called for in their application, since the acid gases become phytotoxic if the concentration of the pesticidal fume is excessive. The gases obtained from compositions based on sensitized guanidine nitrate contain ammonia and so they are also phytotoxic if the concentration of the pesticidal fume is excessive.

It is also known that pest control smoke generating compositions can be obtained from a mixture comprising a thermally vaporizable pesticidal compound and ammonium dichromate, either alone or in association with guanidine nitrate, as the compound capable of flameless exothermic gas-producing decomposition.

Neither ammonium dichromate nor guanidine nitrate is noticeably hygroscopic, although mixtures of the two compounds when stored at temperatures slightly exceeding 35° C. tend to react with the formation of hygroscopic ammonium nitrate. Again, although ammonium dichromate has the advantage that the gases produced are almost neutral and substantially devoid of phytotoxicity, their biological efficiency is much lower than those of compositions based on ammonium nitrate or guanidine nitrate sensitized by means of a relatively small proportion of a salt of chromic acid.

It is therefore desirable to be able to produce pest control smoke generating compositions capable of yielding substantially neutral non-phytotoxic gases of biological efficiencies as high as those obtainable from known compositions.

According to the present invention a pest control smoke generating composition comprising one or more vaporizable pest control compounds and ammonium dichromate is characterized in that said composition includes potassium persulphate.

The gases obtained from mixtures of ammonium dichromate and potassium persulphate are very faintly acid, but according to a further preferred embodiment of the invention the mixture capable of self-sustained flameless gas-producing exothermic decomposition with which the vaporizable pest control compound is in association also contains a minor proportion of guanidine nitrate whereby the gases obtained may be adjusted to neutrality or to slight alkalinity without detriment to their non-phytotoxic character.

The pest control smoke generating compositions of this invention are of non-hygroscopic character, and are of high biological efficiency. They yield a friable ash which retains only a very small proportion of the pest control compound and their reaction temperature tends to be somewhat lower than those of the hitherto known smoke generating compositions, which may to some extent account for their high biological efficiency.

In the composition the amount by weight of potassium persulphate to ammonium dichromate is preferably between 2:3 and 3:2. The ratio by weight of guanidine nitrate to that of the combined weights of potassium persulphate and ammonium dichromate is not greater than 1:4 and is preferably of the order of 1:10, and the ratio by weight of the vaporizable pest control compound to these three ingredients may conveniently be from 1:100 to 3:2 depending on the individuality of the pest control compound.

Suitable pest control compounds include, azobenzene, benzene hexachloride, alpha,alpha-bis(parachlorophenyl)-beta,beta,beta-tri-chlorethane, hexaethyltetraphosphate, paranitrophenyl diethyl thiophosphate, "Thanite" (85 per cent isobornyl-thiocyano-acetate), ortho-dichlorbenzene, tetrachlorethane, dimethylphthalate and tetraethyl pyrophosphate.

A cartridge made up from a charge of the composition and a casing for said charge may advantageously include a small piece of fuse or of match composition or other igniting composition in contact with the fumigating charge in order to facilitate the ignition of the latter from an ordinary domestic friction match, electric fusehead or other source of ignition. The fumigating charge may be in compact form, and for its production the pulverulent mixture of ingredients may be subjected to compression. Alternatively the mixture may be made into compact form with the aid of a binder or bonding agent, and may be extruded or moulded into form. Otherwise the fumigating charge may conveniently be lightly compacted in a cartridge having a paper or other suitable wrapper or envelope.

The compositions of the invention are illustrated by the examples set out in Table 1 in which all parts are by weight. In the examples the pest control compounds used are as follows:

| Example | Pest control compound |
|---|---|
| 1 | Hexachlorocyclohexane containing 13 percent of the gamma isomer. |
| 2 | Hexachlorocyclohexane containing 90 percent of the gamma isomer. |
| 3 | Alpha,alpha - bis(parachlorophenyl) - beta,beta,beta - tri-chlorethane (technical). |
| 4 | Azobenzene (technical). |
| 5 | Paranitrophenyl diethyl thiophosphate (crude 70 percent). |
| 6 | Azobenzene (technical)/Paranitrophenyl diethyl thiophosphate (crude 70 percent). |
| 7 | Alpha,alpha - bis(parachlorophenyl) - beta,beta,beta - tri-chlorethane (technical). |
| 8 | Hexachlorocyclohexane containing 13 percent of the gamma isomer. |

Table 1

| Examples | 1 | 2 | 3 | 4 | 5 | 6 | 7 | 8 |
|---|---|---|---|---|---|---|---|---|
| Active ingredient | 45.0 | 16.0 | 40.0 | 20.0 | 8.25 | 20.0/6.75 | 40.0 | 45.0 |
| Potassium persulphate | 24.75 | 26.5 | 27.0 | 27.0 | 22.25 | 25.25 | 28.0 | 27.0 |
| Ammonium dichromate | 24.75 | 26.5 | 27.0 | 27.0 | 22.25 | 25.25 | 32.0 | 28.0 |
| Guanidine nitrate | 5.5 | 6.0 | 6.0 | 6.0 | 5.0 | 5.75 | | |
| China clay | | 25.0 | | 20.0 | | | | |
| Sodium chloride | | | | | 19.75 | | | |
| Kieselguhr | | | | | 22.5 | 17.0 | | |
| Decomposition temperature, °C | 260 | 335 | 285 | 330 | 285 | 280 | 280 | 270 |
| Percentage of active ingredients retained in ash | | 1 | 16.7 | 2.5 | | | 19.6 | |
| Percentage acidity of gases as $NO_2$ | 0.27 | 0.17 | 0.35 | | | | (¹) | (²) |

| Biological Efficiency | | | | | | | | | | |
|---|---|---|---|---|---|---|---|---|---|---|
| Pesticide in composition | Test insect | | | | | | | | | |
| Paranitrophenyl diethyl thiophosphate | Aëdes aegypti (larvae) percent | | | | | 85 | | | | |
| Azobenzene | | | | | | | | | | |
| Hexachlorocyclohexane | Triboleum castaneum Hbst percent | 90 | 80 | | | | | | | |
| αα bis(p.chlorophenyl)βββ trichlorethane | Aëdes aegypti (larvae) percent | | | 89 | | | | | | |
| αα bis(p.chlorophenyl)βββ trichlorethane | Triboleum castaneum Hbst percent | | | 32.5 | | | | 32.3 | | |
| Phytotoxicity (test plant tomato) | | | 0.0 | | 0.0 | 0.3 | | | | |

¹ Alkaline.
² Acid.

For purposes of comparison, figures for conventional pest control vapor generating compositions are given in Table 2. The pest control compounds used in the compositions shown are as follows:

| Composition | Pest control compound |
|---|---|
| 1 | Para-nitrophenyl diethyl thiophosphate (crude 70 percent). |
| 2 | Azobenzene (technical). |
| 3 | Hexachlorocyclohexane containing 90 percent of the gamma isomer. |
| 4 | Hexachlorocyclohexane containing 13 percent of the gamma isomer. |
| 5 | Hexachlorocyclohexane containing 13 percent of the gamma isomer. |
| 6 | Hexachlorocyclohexane containing 90 percent of the gamma isomer. |
| 7 | Hexachlorocyclohexane containing 13 percent of the gamma isomer. |
| 8 | Alpha, alpha-bis (parachlorophenyl) beta, beta, beta-trichlorethane (technical). |
| 9 | Hexachlorocyclohexane containing 13 percent of the gamma isomer. |
| 10 | Hexachlorocyclohexane containing 13 percent of the gamma isomer. |

What we claim is:

1. A pest control smoke generating composition comprising at least one vaporizable pest control compound, ammonium dichromate, and potassium persulphate, wherein the amount by weight of potassium persulphate to ammonium dichromate is between 2:3 and 3:2.

2. A pest control smoke generating composition as claimed in claim 1 which includes a minor proportion of guanidine nitrate.

3. A pest control smoke generating composition as claimed in claim 2 wherein the ratio by weight of the vaporizable pest control composition to the combined weights of potassium persulphate, ammonium dichromate and guanidine nitrate is from 1:100 to 3:2.

4. A pest control smoke generating composition as claimed in claim 2 wherein the ratio by weight of guanidine nitrate to that of the combined weights of potassium persulphate and ammonium dichromate is not greater than 1:4.

5. A pest control smoke generating composition as claimed in claim 4 wherein the said ratio is 1:10.

6. In a smoke generator, a pest control smoke generating composition comprising at least one vaporizable pest control compound, ammonium dichromate, and potassium persulphate, wherein the amount by weight of potassium persulphate to ammonium dichromate is between 2:3 and 3:2.

Table 2

| Composition | 1 | 2 | 3 | 4 | 5 | 6 | 7 | 8 | 9 | 10 |
|---|---|---|---|---|---|---|---|---|---|---|
| Active ingredient | 18.2 | 20.0 | 16.0 | 25.0 | 25.0 | 16.0 | 47.5 | 40.0 | 30 | 30 |
| Ammonium nitrate | 57.7 | 72.0 | 66.6 | 61.5 | 67.5 | 70.0 | 32.0 | | | |
| Guanidine nitrate | | | | | | | | 40.0 | | 20 |
| Potassium chromate | 6.5 | 8.0 | 7.4 | 7.5 | 7.5 | 8.0 | | | | |
| Ammonium oxalate | 9.6 | | | | | | | | | |
| Ammonium dichromate | | | | | | | 17.5 | 12.0 | 70 | 50 |
| Potassium nitrate | | | 6.0 | 6.0 | | 6.0 | | | | |
| Cuprous chloride | | | | | | | 3.0 | 7.5 | | |
| Sodium chloride | 4.8 | | | | | | | | | |
| Kieselguhr | 10.7 | | | | | | | | | |
| China clay | | | 4.0 | | | | | | | |
| Decomposition temperature, °C | 460 | 360–380 | | 310 | 330 | | 450 | 420 | 380 | 500 |
| Percentage of active ingredients retained in ash | | 30 | 23 | | | 13.6 | | 16 | | |
| Percentage acidity or alkalinity of gases | 3.8 $NO_2$ | 4.5 $NO_2$ | 6.8 $NO_2$ | | 5.6 $NO_2$ | 6.2 $NO_2$ | 6.4 $NO_2$ | 1.7 $NH_3$ | | |

| Biological Efficiency | | | | | | | | | | | |
|---|---|---|---|---|---|---|---|---|---|---|---|
| Pesticide in composition | Test insect | | | | | | | | | | |
| Para-nitrophenyl diethyl thiophosphate | Aëdes aegypti (larvae) percent | 94 | | | | | | | | | |
| Azobenzene | | | | | | | | | | | |
| Hexachlorocyclohexane | Triboleum castaneum Hbst percent | | | 85 | 77 | 77 | 85 | 88 | | 36 | 9 |
| αα bis (parachlorophenyl) βββ trichlorethane | Aëdes aegypti (larvae) percent | | | | | | | | 87 | | |
| Phytotoxicity (test plant tomato) | | 4.1 | | 4.5 | | | | | 3.1 | | |

7. A smoke generator as claimed in claim 6 wherein the charge is in contact with an igniting means.

8. A smoke generator as claimed in claim 6 wherein the igniting composition is a small piece of fuse.

9. A smoke generator as claimed in claim 6 wherein the igniting composition is a match composition.

References Cited in the file of this patent

UNITED STATES PATENTS

| Number | Name | Date |
|---|---|---|
| 2,557,814 | Dinsdale | June 19, 1951 |

FOREIGN PATENTS

| Number | Country | Date |
|---|---|---|
| 631,114 | Great Britain | Oct. 27, 1949 |
| 636,692 | Great Britain | May 3, 1950 |